June 29, 1965 J. W. HENDRY 3,192,299
INJECTION MOLDING MACHINE AND PROCESS FOR
PLASTICIZING PLASTIC MATERIAL
Filed June 28, 1961 3 Sheets-Sheet 1
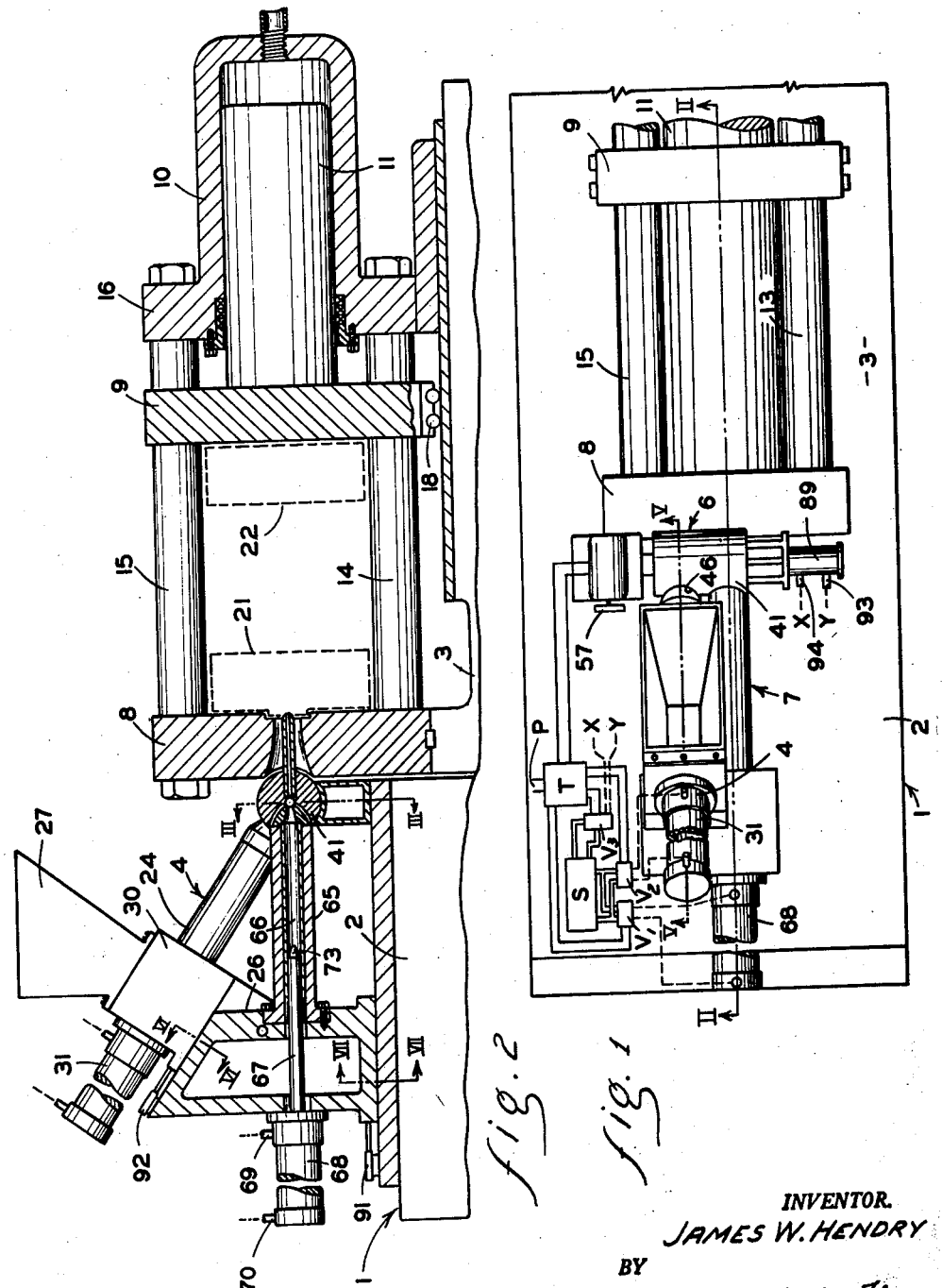
INVENTOR.
JAMES W. HENDRY
BY
Woodhams Blanchard and Flynn
ATTORNEYS

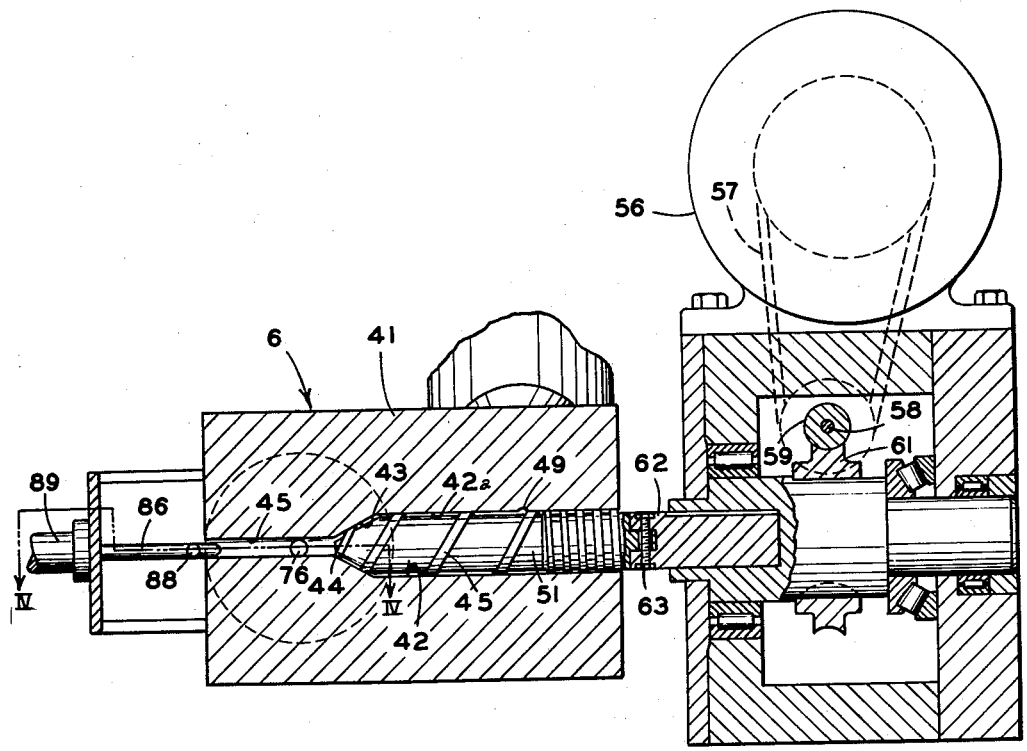
fig. 3
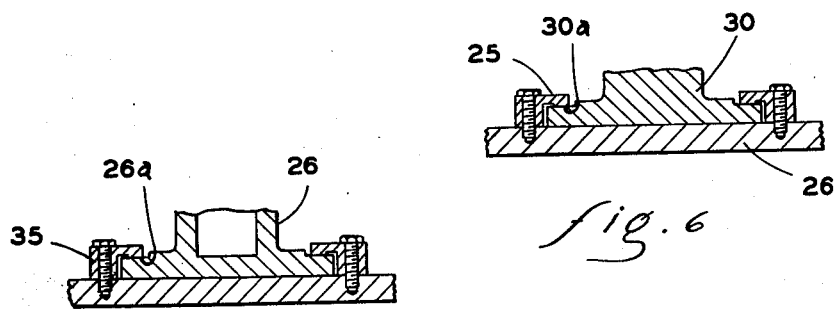
fig. 7
fig. 6
INVENTOR.
JAMES W. HENDRY
BY
Woodhams Blanchard and Flynn
ATTORNEYS June 29, 1965 J. W. HENDRY 3,192,299
INJECTION MOLDING MACHINE AND PROCESS FOR
PLASTICIZING PLASTIC MATERIAL
Filed June 28, 1961 3 Sheets-Sheet 3

INVENTOR.
JAMES W. HENDRY
BY
Woodhams Blanchard & Flynn
ATTORNEYS

United States Patent Office 3,192,299
Patented June 29, 1965

3,192,299
INJECTION MOLDING MACHINE AND PROCESS
FOR PLASTICIZING PLASTIC MATERIAL
James W. Hendry, Scottsburg, Ind., assignor to Borg-Warner Corporation, Chicago, Ill., a corporation of Illinois
Filed June 28, 1961, Ser. No. 120,268
10 Claims. (Cl. 264—329)

This invention relates to a process for plasticizing plastic materials and to a machine in which raw plastic material is fed under pressure to a plasticizing screw which in turn supplies plasticized material to an injection cylinder.

Plastic materials available for molding purposes, whether of thermoplastic or thermosetting nature, vary widely in their tolerance to elevated temperatures. Certain materials, such as polystyrene and the plasticized vinyls, have a wide temperature tolerance and can be subjected to molding temperatures for a long period of time without undergoing charring or other forms of disintegration. There are other plastic materials, however, of which many have desirable properties but which have only extremely limited temperature tolerance (referring to either or both the magnitude of the temperatures to which the material may be subjected and/or the time period for which the material may be subjected to an otherwise safe temperature) and which will in some cases char or otherwise disintegrate and in other cases set and become unmoldable if the temperature tolerance is exceeded, either as to magnitude or duration. Examples of these latter materials include unplasticized polyvinyl chloride, poly-oxy-methylene and acrylonitrile, butadiene and styrene copolymers.

Previous work in this field has recognized the necessity of effecting close control over the temperature of the material and the necessity of moving all of the material through the machine in order that none thereof would be permitted to accumulate within the machine and none thereof would be subjected either to an excessive temperature or to an acceptable temperature but for an excessive period of time and thereby cause same to disintegrate or set and such methods have received commercial acceptance. However, the machines utilized in the past for carrying out these concepts have effected their heating of the plastic material over a period of time substantially in excess of a single molding cycle and, hence, for certain plastic materials, such machines have provided a heating period which was longer than such plastics could tolerate.

In my application Serial No. 4,978, I have set forth an entirely different approach to the plasticizing of a moldable material. In the concept of that application, I start with a material which is in a soft and somewhat rubbery condition. Materials such as the elastomeric vinyls are in such a condition at normal room temperatures and may be so used. Materials such as unplasticized polyvinyl chloride, acrylonitrile, butadiene and styrene copolymers, or methyl methacrylate are hard or horny granules at normal room temperature and must be somewhat preheated to a temperature at which at least part of the granules adhere to each other and the whole mass is of a somewhat rubbery character but which temperature is still well below the molding temperature. For example, acrylonitrile, butadiene and styrene copolymers which mold at about 425 degrees F. are preheated to about 280 degrees F. This condition, preheated or at room temperature according to the nature of the material and in any event properly dried, will for convenience be hereinafter termed the "initial" condition of the plastic material.

In the machine of my prior application, a pressure build-up is provided within the plastic material without appreciable agitation of the material and accordingly without appreciable accompanying increase in the temperature thereof beyond its initial condition. A screw then receives the material and subjects it to an intensive agitation and frictional working whereby it is heated, plasticized and then discharged into an injection cylinder ready for molding, the amount of plastic material in the screw at any one time being preferably substantially less than the amount required for any given molding cycle. Thus, the plastic material is held at a non-harmful temperature right up to the point of its actual entry into the injection cylinder, is then very quickly heated and plasticized by the screw and the only amount which remains in the screw between injection cycles is in most cases much less than the amount required for a single filling of the mold.

A further problem with many conventional machines is that when materials containing chloride radicals, such as the vinyls, are molded, it is necessary to clean the machine promptly after each use thereof. Otherwise, material remaining in the machine will disintegrate by virtue of the retained heat within the machine. Such disintegration is accompanied by the release of hydrogen chloride fumes which will combine with atmospheric moisture to form hydrochloric acid and attack the metal of the machine. The resulting corrosion can in some cases progress very rapidly and will be extremely harmful to the machine for obvious and well understood reasons. Most conventional machines comprise fully integrated parts which are difficult to take apart and accordingly the cleaning job often requires several hours and sometimes requires heavy cranes or other parts-handling equipment to handle the parts of the machine, especially the plasticizing screw. In the machine of the present invention, however, the screw is sufficiently small even for a relatively large machine that in many cases it can, if necessary, be handled without difficulty and the entire machine can be cleaned in less than an hour.

While the apparatus shown in said Serial No. 4,978 has been successfully embodied in a working unit, certain deficiencies have appeared in working with such apparatus which required improvement and accordingly, in pursuance of a continuous effort to improve such equipment, the machine of the present invention has been developed.

Accordingly, the objects of the invention are:

(1) To provide a process for plasticizing plastic materials and a plastic molding machine of the injection type capable of molding plastic materials, and particularly highly heat-sensitive plastic materials, accurately, rapidly and without either of appreciable degradation or setting of the material within the machine.

(2) To provide a process for plasticizing plastic materials and a commercially practicable plastic injection molding machine capable of carrying out the process of the above-mentioned Serial No. 4,978 wherein plastic material under relatively high pressure but relatively low temperature is fed to a plasticizing screw which then quickly plasticizes same to a molding condition and delivers it to an injection cylinder.

(3) To provide a process for plasticizing plastic materials and a machine, as aforesaid, which will materially reduce as compared to previously known machines the duration of time during which the material being molded is held at the molding temperature prior to its actual injection into a mold.

(4) To provide a machine, as aforesaid, comprising three separable units, namely, a feeding unit, a plasticizing unit, and an injection unit, each unit being capable of removal from and replacement in a machine without appreciable disturbance of the other units.

(5) To provide a machine, as aforesaid, wherein the several units may operate at different and varying temperatures and said machine is arranged to compensate for changes in temperature within the parts thereof without disturbing its effective operation.

(6) To provide a machine, as aforesaid, wherein the plasticizing unit thereof is housed in a separate section and the feeding means and the injection cylinder are so related thereto that changes in temperature occurring in said plasticizing unit will substantially all be absorbed only in the expansion or contraction of said plasticizing unit and neither the feeding means nor the injection means, nor the connection between either of said means and said plasticizing unit, will be appreciably affected by such changes in the temperature of the plasticizing unit.

(7) To provide a plasticizing machine, as aforesaid, wherein the longest axis of each of the feeding unit and the injection unit are placed substantially perpendicularly to the axis of principal expansion of the plasticizing unit whereby expansion or contraction of said plasticizing unit will cause merely a slight pivotal movement of the feeding unit and injection cylinder and to provide means whereby such pivotal movement can be absorbed without interfering with the operation of the apparatus.

(8) To provide a machine, as aforesaid, whose parts can be readily separated from each other for cleaning.

(9) To provide a machine, as aforesaid, whose parts may be readily separated from each other and replaced by other parts having different specific characteristics whereby the machine may be readily adapted to use with plastic materials of varying characteristics.

(10) To provide a machine, as aforesaid, whose individual units are distinct from each other and are readily accessible for the application of varying temperature control devices as required from time to time according to the characteristics of the particular plastic material being handled at a given time.

(11) To provide a machine, as aforesaid, whose individual parts are sufficiently simple that the machine can be made wthout incurring excessive costs.

(12) To provide a machine, as aforesaid, which will be capable of maintenance at a relatively low cost.

(13) To provide a machine, as aforesaid, which will require much less power input per pound of plastic material molded than machines previously known and will accordingly be relatively less expensive to operate than presently known plastic injection molding machines.

Other objects and purposes of the invention will be apparent to persons acquainted with machines of this general type upon reading the following disclosure and inspecting the accompanying drawings.

Referring now to the drawings:

FIGURE 1 is a top plan view of a machine embodying the features of the invention.

FIGURE 2 is a sectional view taken on the line II—II of FIGURE 1.

FIGURE 3 is a sectional view taken on the line III—III of FIGURE 2.

FIGURE 3 is a sectional view taken on the line IV—IV of FIGURE 3.

FIGURE 6 is a sectional view taken on the line VI—VI of FIGURE 2.

FIGURE 7 is a sectional view taken on the line VII—VII of FIGURE 2.

GENERAL DESCRIPTION

Figure 5:
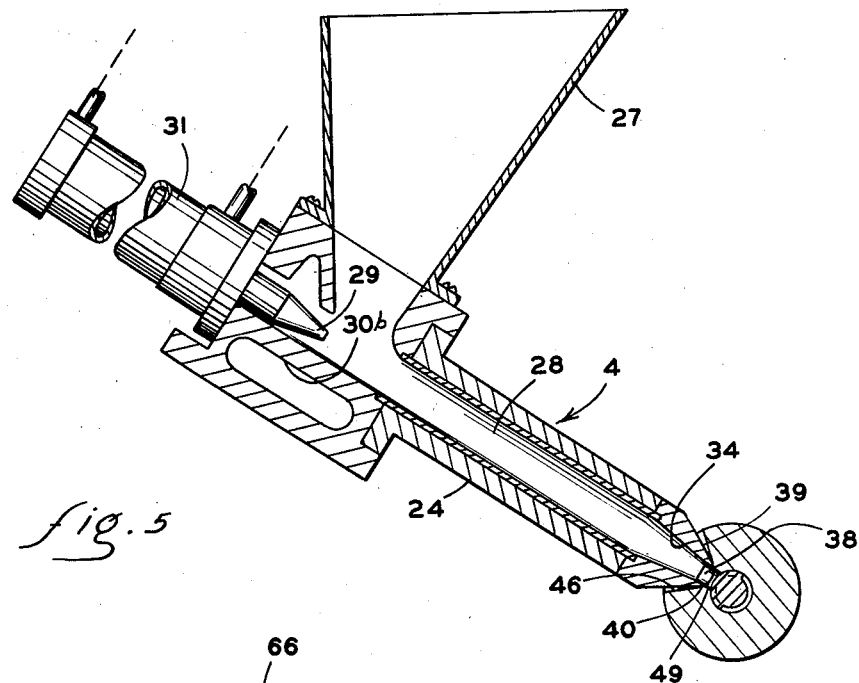
FIGURE 5 is a sectional view taken on the line V—V of FIGURE 1.

In general the invention comprises providing a central block having an elongated, plasticizing chamber therein with a plasticizing screw in said chamber. A feeding cylinder containing a fluid energized ram is arranged to communicate with said plasticizing chamber adjacent the feeding end of said screw for supplying unplasticized material thereto at an appreciable pressure but at a relatively low temperature, including room temperature. An injection cylinder is provided adjacent the discharge end of said screw together with valving mechanism by which said plasticizing screw will discharge plasticizing material into said injection cylinder and said material may then be driven by a suitable injection ram out from said injection cylinder into a mold. Both the feeding cylinder and the injection cylinder extend from the central block along lines substantially perpendicular to the central axis of the plasticizing screw. Further, both the feeding cylinder and the injection cylinder are connected to said central block by flexible joint means, such as a spherical joint, so that elongated of said central block in a direction parallel to the axis of the plasticizing screw will not impair the connection between said cylinders and said block but said relative movement will be merely absorbed by said flexible joints. Suitable control mechanism is provided in any convenient manner for coordinating operation of the respective parts.

In such a machine I have obtained a ratio of as high as twenty pounds of molded material output per horsepower input as compared to 3 or 4 pounds of molded material output per horsepower input which is usually attained in many presently known machines.

DETAILED DESCRIPTION

In describing the embodiment selected for illustrating the invention, certain terminology will be used which will be recognized as for convenience in reference only and not limiting. For example, the words "upward" and "downward" will be used with reference to the normal position of the apparatus in use, the terms "rightward" and "leftward" will be utilized with reference to the directions appearing in the accompanying drawings and the terms "inward" and "outward" will be utilized with reference to directions toward and away from the geometric center of the apparatus. All of said terms will include derivatives of the words above specifically mentioned as well as word of similar import.

Referring now to the drawings, there is provided a base 1 of any convenient kind adaptable for fastening to suitable supporting means, as a floor, and capable of supporting the apparatus. Said base may be formed as a single unit or of a plurality of units as desired, the same being here shown as formed of two interconnected parts 2 and 3.

Supported on said base is a feeding unit 4, a plasticizing unit 6, an injection unit 7, mold supporting platens 8 and 9 and suitable clamping means including a clamp cylinder 10 and a ram 11.

Turning now to a more detailed description of the several parts above summarized, the fixed mold supporting platen 8 is fastened in any convenient manner to the base portion 3 and extends upwardly therefrom. A plurality of conventional tie bars, of which three appear at 13, 14 and 15, extend from said platen to the anchor member 16 which is also mounted on the base member 3 and is here a part of the clamp cylinder 10. The movable platen 9 is slidably arranged in the usual manner on said tie bars, may if desired be supported by rollers 18 on said base member 2 and is actuated by the clamp cylinder 10 acting through its plunger 11. Mold sections may be affixed to the platens in the usual manner and are indicated schematically by broken lines at 21 and 22 in FIGURE 2.

(a) The feeding unit

Turning now in more detail to the apparatus embodying the invention, attention is first directed toward the feeding unit 4 (FIGURES 2 and 5). This consists of a feeding cylinder 24 supported by a base 26 onto the base structure 2. The feeding cylinder 24 is preferably arranged with respect to the base 26 for a limited sliding relationship thereto in order to compensate for changes in the relative positions thereof brought about by temperature differences. This sliding relationship may be provided in any convenient manner but in this particular embodiment, as shown in FIGURE 6, same is accomplished by providing guides 25 fastened to the base 26 and engaging suitably machined slideways 30a on the support 30 to which said cylinder 24 is attached. A water jacket of which a portion appears at 30b (FIGURE 5) is preferably provided for cooling said support 30. Any convenient means such as a pressure fluid actuated cylinder 92 (FIGURE 2) may be provided, if desired, for moving the support 30 along and on the base 26 toward and away from the plasticizing unit 6.

A hopper 27 is fixed to and is located above the support 30 and communicates with a central opening 28 within the feeding cylinder 24. A feeding ram 29 is reciprocably arranged within said opening 28 for operation by a feeding ram cylinder 31. The inner surface of said feeding cylinder 24 defining said central opening 28 is tapered at 34 and defines a slightly smaller included angle than the included angle defined by the taper at the end of the feeding ram 29. By this means the feeding ram 29 will contact the tapered surface 34 most tightly at the portion of maximum diameter thereof and thereby tend to squeeze all plastic material from between the tapered end portion of said ram and the tapered surface 34 of the central opening forwardly and thereby through the discharge opening 38.

The outer surface of the feeding cylinder 24 is also tapered at 39 adjacent its discharge end and is provided with a spherical end surface 40 concentric with the axis of said feeding cylinder. Said spherical surface 40 interfits with the central block as described further hereinafter and provides for one of the movable joints above mentioned.

*(b) The plasticizing unit*

The plasticizing unit 6 comprises in this embodiment a central block 41 having a central plasticizing opening 42 (FIGURE 3) therethrough. Said central opening 42 has a substantially cylindrical rightward portion defining a plasticizing chamber 42a but it tapers at 43 adjacent the discharge end 44 of the screw 51 and then continues with the leftward end portion 45 thereof having a uniform, but smaller, diameter. A recess 46 (FIGURE 5) having its radially outer portion of conical shape and its radially inner portion of spherical shape is provided in the block 41 for receiving the discharge end of the feeding cylinder 24. The block 41 has a feed opening 49 communicating between the plasticizing chamber 42a and recess 46 and which is in registry with the discharge opening 38 of the feeding cylinder 24. This provides for supplying raw plastic material under pressure from the feeding cylinder 24 to the plasticizing chamber 42a. The radially inner, spherical portion of the recess 46 is of substantially the same diameter as the spherical surface 40 of the feeding cylinder and the radially outer, conical portion of said feeding recess defines a slightly wider included angle than the conical portion of the feeding cylinder. Thus, in this embodiment, the discharge end of the feeding cylinder 24 fits snugly into the recess 46 of the central block 41 but it is able to move angularly slightly with respect thereto without destroying the sealing relationship between same provided by the two contacting spherical surfaces.

The guides 25 may be clamped by the bolts shown in FIGURE 6 to hold the base 30 rigidly in place whereby to hold said feeding unit 4 firmly in position with its discharge end received in said recess 46 or, if preferred, the holding of said feeding unit 4 in position against the plasticizing unit 6 may be accomplshed by maintaining pressure in said fluid pressure cylinder 92.

The plasticizing portion of the plasticizing screw 51 is relatively short and extends only from a point slightly to the right (FIGURE 3) of the feeding opening 49 to a point as close as possible to the small end of the tapered portion 43 of the opening 42. Said screw has a relatively large root diameter so that the root surface thereof is spaced only a short distance, as 1/16 of an inch, from the surface defining the plasticizing chamber 42a. Thus, the threads 45 on said screw are of relatively small radial extent and they are made to run as close as possible without binding against the wall of the plasticizing chamber 42a. The threads of said screw can be any of many well-known shapes according to the particular plasticizing characteristic required and particularly said threads may be of constant or variable pitch as desired and will in many cases be of a constantly diminishing pitch, or variable root change, from the feeding end to the discharge end so that the plastic material is subjected to working of progressively increasing intensity up to the point of its discharge from the plasticizing chamber 42a.

While 1/16 of an inch was mentioned above in connection with the spacing of the root surface of the screw from the surrounding chamber walls, it will be recognized that this spacing is only illustrative of the general order of such spacing and same may be varied as needed in a particular case.

The portion of the screw located rightwardly of the feed inlet 49 may, if desired, be provided with a shallow groove of opposite hand to the groove defined between the threads 45 of the screw. This, if used, will maintain a continuous body of plastic material around the rightward part of said screw for lubrication thereof and it will move same positively rightwardly so that none thereof can return into the body of plastic material being molded and contaminated same. Said material is in this embodiment, and preferably, discharged from chamber 42a at the point where the screw 51 emerges from the block 41.

The plasticizing screw 51 is driven in any convenient manner, preferably by means enabling the speed of rotation to be adjusted according to the type of plastic material being handled. In this embodiment a variable speed motor 56 acts through a belt 57 to drive a shaft 58 and thereby a worm 59. Said worm drives worm gear 61 which in turn drives a shaft 62 which in turn through a coupling 63 drives the plasticizing screw 51.

*(c) The injection unit*

The injection unit 7 comprises an injection cylinder 65 having an internal injection chamber 66 with a slidable ram 67 arranged therein. A pressure fluid cylinder 68 operates said ram 67 and is in turn operated through pressure connections 69 and 70 which are actuated and controlled in any convenient manner.

The discharge end of said injection cylinder 65 is provided with a tapered, substantially conical end 71 having a spherical tip 72 concentric with the axis of said chamber. The discharge end of the injection chamber is similarly conical and the injection ram 67 has a conical tip 73 which, like in the case of the feed ram 29 above mentioned, preferably defines a slightly greater included angle than the conical end of the injection chamber in order to squeeze the maximum amount of plastic material out through the end of the injection chamber. The extreme end of the injection chamber is provided with a discharge opening 74 which is in registry with a passageway 76 in the central block 41 and hereinafter further described.

The injection cylinder 65 is also mounted on the base 26. Said base 26 is fixed to the base structure 2 in a manner providing for sliding movement of said base 26 toward and away from the plasticizing unit 6 as desired by the operator. Such sliding relationship may be established in any convenient manner, such as by the means as shown in FIGURE 7 wherein guides 35 are provided on said base structure 2 for receiving and guiding the slideways 26a on the base 26. Any convenient means, such as a pressure fluid cylinder 91, may be provided for moving said base 26 along and on the base structure 2 toward and away from said plasticizing unit 6.

*(d) Injection portion of central block and valve apparatus*

Returning now to the central block 41 a recess 75 is provided therein and said recess has a conical, radially outer portion 77 and a spherical, radially inner portion 78, said spherical portion being of substantially the same radius as the spherical portion 72 of the injection cylinder, whereby the injection cylinder will seal tightly against said central block when the discharge opening 74 is in substantial registry with passageway 76 of the central block. However, the conical portion 77 of the injection recess defines a slightly greater included angle, such as three or four degrees, than the corresponding part 71 of the injection cylinder so that said injection cylinder may move slightly angularly with respect to the axis of the central block and thereby to permit said central block to expand or contract in a direction parallel with said axis without weakening the seal provided by said spherical surfaces between the injection cylinder and the central block.

The guides 35 may be clamped by bolts shown in FIGURE 7 to hold said base 26 rigidly in place whereby to hold the spherical portion 71 of the discharge end of said injection unit 7 firmly against the spherical portion 78 of said recess 75, or, if preferred, the holding of said injection unit in position against the plasticizing unit may be accomplished by maintaining pressure in said fluid pressure cylinder 91.

The passageway 76 leads from the bottom of the recess 75 to the opening 45 above described. A further passageway 81 which is coaxial with the passageway 76 is provided in block 41 and extends from the opening 45 to a suitable injection nozzle 82. Said nozzle 82 may be of any conventional construction and is arranged for cooperation in any convenient manner with the portion 21 of the mold associated with the fixed platen 8.

A nozzle valving mechanism is provided by a plunger 85 carrying a gating portion 86 thereon, said gating portion being slidable within passageway 45 and having an angularly-shaped end 87 and an opening 88 therethrough. A pressure fluid cylinder 89 is arranged in any convenient manner fixedly with respect to the central block 41 such as by being mounted on fixed spacers 90. Said pressure fluid cylinder 89 is provided with fluid pressure connections 93 and 94 which are energized and controlled in any convenient manner.

Figure 4:
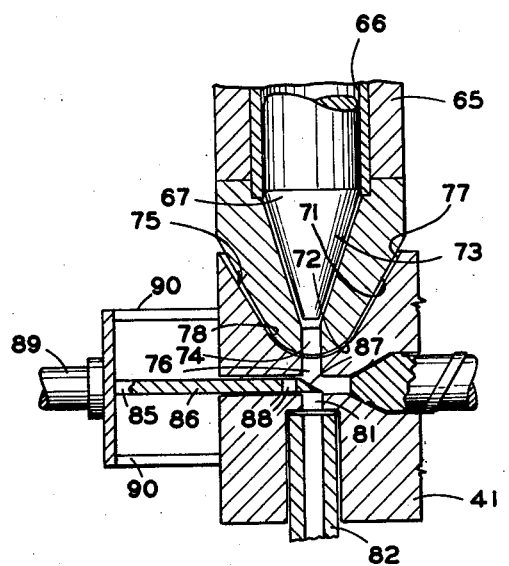

The angular end 87 of said gating portion 86 is proportioned and positioned within the passageway 45 so that in one position, as shown in FIGURE 4, material being discharged from the plasticizing chamber 42a passes through the passageway 45 into and through the passageway 76 to the injection chamber. Advancement of said gating portion 86 toward the plasticizing chamber 42a will block off the passageway 45 from passageway 76 and place opening 88 in communication with passageways 76 and 81 and permits the plasticized material within the injection chamber 66 to be driven by advancement of the ram 67 through the opening 74, passageway 76, opening 88 and passageway 81 to and through the injection nozzle 82 and thence into the mold.

It is preferable to space the cylinder 89 sufficiently from the adjacent wall of the central block 41 that the gating rod 86 can be withdrawn from the passageway 45 sufficiently to expose its opening 88 for cleaning.

Any convenient control mechanism may be provided for actuating the various parts of the machine in proper sequence with respect to each other. Such control mechanisms are well known and hence need no detailed description. It is sufficient merely to indicate that some form of sequence timer T is provided which actuates the motor 57 for driving the plasticizing screw and which sequence timer further acts through appropriate apparatus, such as solenoid valves $V_1$, $V_2$ and $V_3$ connected to a pressure fluid source S, to activate the cylinders 68, 31 and 89, respectively, at the proper times and in the proper directions.

OPERATION

The operation of this apparatus has been somewhat indicated in the foregoing discussion but it will be briefly reviewed in the paragraphs following to insure a clear understanding of the invention.

Starting with plastic material in the above described intial condition, same is permitted to move from the hopper 27 by gravity down into the feeding cylinder 24.

From said feeding cylinder, the material is driven by the feeding ram 29 into the central plasticizing chamber 42a and it is then driven leftwardly through the screw flights. Since the space between the root of the screw and the walls of the surrounding plasticizing chamber is very small, often appreciably less than the corresponding dimension of a granule of the plastic material, the material is squeezed, worked and rubbed at a sufficient rate of speed that same becomes frictionally heated and plasticized very quickly. It will be evident that the pressure of the feeding ram 29 urging said plastic against the feeding end of the screw 51 will place the material which is within the plasticizing screw under sufficient pressure that it will respond immediately to the working thereof on and by the plasticizing screw so that the plasticizing operation will progress very quickly. Moreover, since the feeding ram 29 exerts a pressure on the material as it moves on through the plasticizing chamber 42a, the material will move therethrough much faster than it would if only the screw 51 were used for this purpose. In this regard it should be noted that a screw by itself has a relatively low volumetric feeding efficiency, e.g., 20% due to the fact that, because of the back pressure effects, the material slides rearwardly with respect to a point on said screw as said point advances. Since the pressure exerted by the ram 29 acts in opposition to such back pressure, it at least retards and in appropriate cases may entirely prevent such sliding so that the efficiency of the screw 51 is much higher and may even be 100% or higher. Both the net effective pressure moving the material forwardly and the frictional heat developed in the plastic material by the plasticizing screw 51 can be controlled very accurately, primarily by adjusting the rate of rotation of the plasticizing screw 51, so that the viscosity (and thereby the temperature) of the plastic material entering into the passageway 45 and from there into the injection cylinder can be controlled closely.

As the material for a given plastic molding operation is discharged from the spaces between the screw flights of the plasticizing screw, the force imposed thereon by said screw flights and by ram 29 will drive said material through the passageways 45 and 76 into the injection chamber. When the injection chamber first begins to fill the ram 67 will be in its advanced position as shown in FIGURE 4 and the filling of said chamber will be accomplished by forcing said ram to its retracted position. Thus a pressure exerted by the weight of the ram will be imposed on the material and this may be increased by placing a pressure in cylinder 68 opposing retracting movement of the ram.

As will be seen in the drawings, the capacity of the injection chamber in a molding operation is normally much greater than the amount of material which can be held at any one time within the flights of the plasticizing screw and, therefore, in each cycle of operation a considerably greater volume of material passes through the plasticizing screw than the volumetric capacity thereof, and does so at a high rate of speed, so that a strong cleaning action on and with respect to said plasticizing screw is obtained.

When the proper amount of plasticized material has entered the injection chamber 66, both the descent of the feeding ram 29 and the rotation of the plasticizing screw 51 are terminated and the gating rod 86 is moved rightwardly to align its opening 88 with the passageways 76 and 81. The cylinder 68 is now energized to advance the injection ram 67 and drive plastic material to and through the nozzle 82 into the mold. As soon as the material rigidifies the gating rod 86 returns leftwardly to the position shown in FIGURE 4 and the plasticizing cycle is ready to repeat.

The mold may be opened and the molded part removed at any convenient time during the filling of the injection chamber in preparation for the next molding operation.

For cleaning the apparatus, it is necessary to merely back away the feeding and the injection units, which can be done actuating the cylinders 92 and 91, respectively, after loosening the clamps 25 and 35 if same were tightened, without disconnecting any other parts between the feeding unit and the plasticizing unit or between the injection unit and the plasticizing unit. Since the screw is relatively small it may be readily withdrawn from the plasticizing unit and since the passageways through the plasticizing unit are all substantially straight, cleaning thereof will proceed rapidly and easily. The re-assembly of the parts is equally easy and the entire cleaning operation can be performed within a relatively short time as compared to the present conventional injection molding machines of equivalent capacity.

Inasmuch as the temperature of the plastic material in the feeding chamber 28 remains at the initial condition thereof down to the discharge opening 38, and since the volume of material held between said opening 38 and the passageway 76 is normally much less than the volume of material normally required to fill the mold a single time, it will be readily understood that the maximum time during which plastic material will be maintained in a heated condition prior to molding same will be approximately one cycle of a molding operation.

However, it will also be recognized that although the foregoing represents the normal mode of operation of the present invention, where a plastic material has other characteristics which require that a larger volume be plasticized at a given time but which permit same to be held at a molding temperature for a period of time longer than one cycle, then it is entirely possible and within the broader scope of the invention to use a larger and/or longer plasticizing chamber and screw arrangement having a larger volumetric capacity as compared to the volume of material injected into a mold in a given cycle.

It will also be recognized that the feeding unit, the plasticizing unit and the injection unit can be manufactured independently of each other and units of different characteristics may be interchanged with each other to fit varying characteristics of material being used or of articles being formed.

For example, the feeding unit may be widely modified as to both size and/or type without necessitating change in either of the other two units; the plasticizing unit may be either shortened or elongated or changed in diameter without necessitating the change in either feeding unit or the injection unit; and the injection unit may be freely modified either as to size or structural details without necessarily requiring change in either the feeding unit or the plasticizing unit. Thus, a variety of components may be maintained available to adapt a given machine or group of machines to plastic materials of different types and said components may be freely selected and be utilized with each other according to the requirements to be met in a given case much more conveniently than is the more conventional practice wherein the feeding, plasticizing and injection units of a given machine are inseparably integrated into and with respect to each other.

If desired, the feeding unit, plasticizing unit and the injection unit may be provided with any suitable heating means for the purpose of maintaining same at predetermined temperature levels.

Although a particular preferred embodiment of the invention has been disclosed in detail for illustrative purposes, it will be understood that variations or modifications of such disclosure, which lie within the scope of the appended claims, are fully contemplated.

What is claimed is:

1. In a process for molding synthetic organic plastic materials, the steps comprising:

placing a quantity of material in a first zone and continuously imposing a superatmospheric pressure by a reciprocating ram on said quantity to move it through said first zone and thence through an orifice into a plasticizing zone, the superatmospheric pressure being of a value sufficient to feed said material into and through said plasticizing zone;

immediately upon entry of material into said plasticizing zone subjecting it to an intensive simultaneous frictional heating, agitation and compression by a rotating screw in said plasticizing zone and, at the same time, progressively moving the material at a high rate of speed through passages of small cross sectional area around said screw and out of said plasticizing zone by said superatmospheric pressure, continuing the heating, agitation and compression of the material at a high level of intensity throughout the entire length of the plasticizing zone for progressively and quickly raising the temperature and reducing the viscosity of the material so that the material leaving the plasticizing zone has a uniform viscosity and temperature suitable for molding; and expelling the material from said plasticizing zone into a shaping apparatus.

2. A process according to claim 1, in which the material expelled from the plasticizing zone is accumulated in an injection chamber and then is injected into a mold.

3. A process according to claim 1, in which the volume of the material being agitated in said plasticizing zone at any one time is substantially less than a single mold charge and is only a small portion of the total quantity of material fed therethrough by said pressure, the material being expelled from the plasticizing zone in a continuous stream, accumulating the plasticized material in an accumulation zone until a quantity substantially equal to a mold charge has been accumulated and then discharging the mold charge into a mold.

4. An injection molding machine, comprising in combination:

a plasticizing unit including means defining an elongated plasticizing chamber having an input end and a discharge end and a passageway communicating with the discharge end of said chamber;

a plasticizing screw within said chamber forming passages of small cross sectional area within said chamber and means for rotating said screw to plasticize the material flowing through said chamber by an intensive simultaneous frictional heating, agitation and compression;

a feeding device for introducing substantially unplasticized plastic material under superatmospheric pressure into said plasticizing chamber at a point adjacent the input end of said chamber, said feeding device comprising an elongated reciprocable ram and power means for reciprocating said ram and capable of exerting sufficient pressure on said ram so that said ram imposes a superatmospheric pressure of a sufficiently great value to feed the material into and through said plasticizing zone; and means defining an elongated injection chamber connected to said passageway and a pressure applying means for driving material from within said injection cylinder into a mold, the longitudinal axes of both said ram and said injection chamber lying in substantially parallel planes, both of which are substantially perpendicular to the axis of said plasticizing screw.

5. An injection molding machine comprising in combination:

a plasticizing unit including means defining an elongated plasticizing chamber having an input end and a discharge end and a passageway communicating with the discharge end of said chamber;

a plasticizing screw within said chamber and means for rotating said screw;

a feeding device for introducing substantially unplasticized plastic material under superatmospheric pressure into said plasticizing chamber at a point adjacent the input end of said chamber;

means defining an injection chamber connected to said passageway;

a pressure applying means for driving material from within said injection chamber into a mold;

a gating rod within said passageway and adapted for occupying two positions therein, one position effecting connection of the plasticizing chamber to said injection chamber and blocking said injection chamber from the mold and the other position effecting connection between said injection chamber and the mold and blocking discharge from said plasticizing chamber, and automatically operable means coordinated with the operation of the rest of the machine for determining the position of said gating rod.

6. A plastic injection molding machine comprising in combination:

a feeding unit including an elongated feeding chamber and a feeding ram reciprocable therein, a feeding passageway leading from the discharge end of said feeding chamber, the external contour of said feeding unit adjacent said feeding passageway including a partially spherical sealing surface;

a plasticizing unit comprising a body part having an elongated plasticizing chamber therein, a feeding unit recess and an inlet passageway leading from said recess to said plasticizing chamber adjacent one end thereof, said feeding unit recess including a partially spherical sealing surface engaging the sealing surface of said feeding unit in snug, sealing relationship, said feeding unit further including a discharge passageway leading from the other end of said plasticizing chamber and being generally coaxial therewith, said plasticizing unit also having an injection cylinder-receiving recess having at least a portion thereof of partially spherical shape and an injection passageway located substantially perpendicular to said discharge passageway and intersecting same, a first part of said injection passageway terminating in said injection cylinder-receiving recess and a second part of said injection passageway being adapted for communication with a mold;

a gating rod movable within said discharge passageway between a first position wherein said discharge passageway is connected to the first part of said injection passageway and the second part of said injection passageway is blocked and a second position wherein said first and second parts of said injection passageway are connected to each other and said discharge passageway is blocked;

an injection unit including an injection cylinder having a reciprocable injection ram located therein, said injection unit having an injection discharge opening and having its external contour adjacent said injection discharge opening formed in a partially spherical sealing surface engaged in sealing relationship with the partially spherical sealing surface of said injection cylinder-receiving recess;

means supporting said feeding unit for movement into and out of sealing relationship in and with respect to the walls of said feeding unit recess and means supporting said injection unit for movement into and out of sealing contact with the walls of said injection cylinder-receiving recess;

a rotatable plasticizing screw within said plasticizing chamber;

means for effecting automatically coordinated actuation of said feeding ram, plasticizing screw, said injection ram and said gating rod whereby plastic material is placed under pressure by said feeding ram, fed therefrom into said plasticizing chamber without appreciable increase in pressure, plasticized within said plasticizing chamber and fed therefrom into said injection cylinder and then moved from said injection cylinder into a mold.

7. The machine defined in claim 6 wherein said gating rod has an angular end and a transverse opening therethrough at a point spaced from said end and said first position is such that said angular end blocks the second portion of said injection passageway but connects said discharge passageway to the first part of said injection passageway and said second position is such that said opening connects the two parts of said injection passageway and said end of said gating rod blocks said discharge passageway.

8. The machine defined in claim 6 including a main base to which the body part of said plasticizing unit is rigidly connected, both said feeding unit and said injection unit being slidable with respect to said main base for movement toward and away from said plasticizing unit.

9. The machine defined in claim 6 including also means on said plasticizing screw for causing a movement of plastic material along said screw from a portion thereof adjacent said inlet opening in a direction away from said discharge passageway and out from said body part whereby lubrication of said screw with respect to said block is provided and the plastic material utilized for such lubrication is positively expelled from said body part and cannot enter into and contaminate the plastic material which is to be molded.

10. A plastic injection molding machine comprising in combination:

a base;

a feeding unit including an elongated feeding chamber and a feeding ram reciprocable therein, a feeding passageway leading from the discharge end of said feeding chamber, the external contour of said feeding unit adjacent said feeding passageway including a sealing surface;

power means for reciprocating said feeding ram and capable of exerting sufficient pressure on said feeding ram so that said feeding ram imposes a superatmospheric pressure of a sufficiently great value to feed the material into and through the hereinafter mentioned plasticizing chamber;

a plasticizing unit comprising a body part fixedly mounted on said base and having an elongated plasticizing chamber therein and a plasticizing device rotatable in said plasticizing chamber, said body part having a feeding unit-receiving recess opening laterally away from said plasticizing chamber adjacent one end thereof, said body part having an inlet passageway leading from said recess to said plasticizing chamber, said feeding unit-receiving recess having a sealing surface sealingly engaging the sealing surface of said feeding unit;

said body part also having an injection cylinder-receiving recess opening laterally away from said plasticizing chamber adjacent the other end thereof, said body part having a discharge passageway leading from said injection cylinder-receiving recess to the other end of said plasticizing chamber, said injection cylinder-receiving recess having a sealing surface;

an injection unit including an injection cylinder having a reciprocable injection ram located therein, power means for reciprocating said injection ram, said injection unit having a discharge opening and having its external contour adjacent said discharge opening forming a sealing surface sealingly engaged with the sealing surface of said injection cylinder-receiving recess;

the longitudinal axes of said injection ram and said feeding ram lying in substantially parallel planes, both of which are substantially perpendicular to the longitudinal axis of said plasticizing chamber;

means mounting said feeding unit and said injection unit for sliding movement with respect to said base toward and away from said plasticizing unit; and power operated means for moving said feeding unit and said injection unit toward and away from said plasticizing unit and for releasably holding same in sealing engagement therewith.

References Cited by the Examiner

UNITED STATES PATENTS

| | | | |
|---|---|---|---|
| 1,156,096 | 10/15 | Price | 18—12 |
| 2,262,989 | 11/41 | Conklin et al. | 18—12 |
| 2,378,539 | 6/45 | Dawihl | 264—111 |
| 2,443,554 | 6/48 | De Mattia | 18—30 |
| 2,469,342 | 5/49 | Richardson | 18—55 |
| 2,478,013 | 8/49 | Roddy | 18—55 |
| 2,493,805 | 1/50 | Dinzl | 18—30 |
| 2,642,623 | 6/53 | Bohannon | 18—30 |
| 2,783,498 | 3/57 | Richardson | 18—12 |
| 2,950,501 | 8/60 | Harkenrider | 18—30 |
| 3,001,234 | 9/61 | Renier | 18—30 |
| 3,029,471 | 4/62 | Adams, et al. | 18—30 |

ROBERT F. WHITE, *Primary Examiner.*

MICHAEL V. BRINDISI, MORRIS LIEBMAN, ALEXANDER H. BRODMERKEL, *Examiners.*